Patented Mar. 29, 1932

1,851,298

UNITED STATES PATENT OFFICE

MAX VOLMER, OF BERLIN-NEUBABELSBERG, GERMANY

PROCESS OF RECORDING ELECTRIC IMPULSES

No Drawing. Application filed July 7, 1930, Serial No. 466,355, and in Germany July 6, 1929.

My invention relates to improvements in the process of recording electric impulses, for instance, signals, and more particularly in the process in which the impulses are recorded by electro-chemical action. The object of the improvements is to provide a process in which little energy is needed for recording the impulse, and in which therefore an impulse of small duration is sufficient for recording the same. With this object in view my invention consists in precipitating, by the said electro-chemical action, a substance which does not by itself act as the colouring medium but which has the action of a catalyst in a reaction producing a dyestuff or another precipitate. Therefore by the said current impulses only slight traces of a substance are precipitated which act as a catalyst for the chemical reaction producing the dyestuff or other precipitate at the part of the recording surface where the catalyst has first been produced.

In processes heretofore in use at the most such an amount of colouring substance has been generated which corresponds to the current equivalent. But in my improved process the thousandfold amount and more of the current equivalent is generated by a chemical process which is affected, by catalytic action, by the primary products of the precipitation by the electric current impulse. Therefore it is sufficient to produce traces of the catalyst by means of minute amounts of electric energy which ordinarily are not visible or hardly visible, and which start the chemical reaction producing the actual record.

As an example for carrying out my improved process, I proceed as follows: The surface such as paper on which the record is to be made is impregnated with a silver salt and moistened. The electrodes are disposed in any known or preferred manner. Preferably the electrode for producing the record is made from carbon or graphite. By the current impulses silver is precipitated, and the said amount may be so slight, that it is not visible at all. Thereafter the paper is dipped into a solution of a reducing medium such as a photographic developing medium, which may contain a little silver salt. On the silver deposits primarily precipitated further silver is deposited, so that the primary impression is made visible. Thus for example 1000 points per second can be drawn by means of a voltage of a little less than 1 volt and a current intensity of a few millionths of an ampere. If it is not desired to work in the dark I use a silver salt which is not sensitive to light, such as the nitrate, or I remove the sensibility to light by means of a known or preferred desensibilizing medium such as picric acid. In lieu of the silver other metals may be used such as platinum, gold, copper, mercury, etc., and to the salts of the said metals alkali salts may be added. The substances needed for the secondary reaction may be contained in the wet paper, so that the secondary reaction takes place immediately after the impulse has been transmitted to the paper, and the record is immediately made visible. Since the colouring substance, in the example referred to the silver, is not sensitive to heat, the apparatus may be arranged so that immediately dry records are produced.

In the practical operation of the process I have found that not all the materials heretofore used for manufacturing electrodes are suitable in my improved process. Some metal electrodes leave traces of the metal on the paper which by themselves have catalytic action on the secondary reaction. In the new process particularly recording electrodes are suitable, which are made from particularly hard substances which are not adapted to produce nuclei. I have found that recording electrodes of great hardness and conductivity are suitable which consist of carbon, silicon, selenium, antimony, tungsten, osmium, aridium, platinum-iridium and platinum-osmium. Further, sulphur metals of conductive property may be used, and I have found that the particles which may be rubbed therefrom are not injurious, because they have no catalytic action.

The carbon, silicon, selenium, and antimony must not necessarily be used in the form of solid bodies, but they may be used in the form of coatings applied to carriers of suitable shape.

In the process an aggregation form of the carbon has been proved particularly satisfactory, which is obtained by decomposition of organic substances, particularly gaseous carbon compounds, on glowing solid bodies, which carbon may be described as a carbon with metallic luster. This carbon is exceedingly hard, and its surface has a high polish. From such electrodes no particles are rubbed, and they do not injure the surface of the paper, which is important because even slight scratches are noticed after development, in a similar way as such scratches are noticed on the sensitized photographic plate. Further, the said form of carbon has a high chemical indifference.

I claim:

1. The process of producing a record of an electrical impulse which includes the following steps: precipitating by electro-chemical action a substance on an electrolytically conductive surface, and utilizing said substance thereafter as a catalyst to initiate a secondary chemical reaction.

2. The method of producing a record of an electrical impulse which consists in the following steps: impregnating a paper surface with a metallic salt, moistening said surface, precipitating the metal by electric impulse, thereafter bringing the paper into contact with a solution of the metallic salt, whereby the metal already precipitated on the paper acts as a catalyst to initiate the further deposition of the metal from the solution upon the already precipitated metal upon the paper.

3. The process according to claim 1, in which a reducing medium is used and in which the substance used is a metallic salt which acts as a catalyst in connection with the reducing medium.

4. The process of claim 1, in which a reducing medium is used and in which the precipitated substance is a metallic salt, the reducing medium being added to the surface after the electrolytic precipitation has occurred.

5. The process of claim 1, in which the substance which is electrically precipitated by electro-chemical action is a metallic salt and in which an additional metallic salt is added by a reducing medium after the initial electrolytic precipitation.

6. The process of claim 1, in which a reducing medium containing a silver salt is added after the electrolytic precipitation and in which the substance electrolytically precipitated is a silver salt which is not sensitive to light at the time of the addition to it of the reducing medium.

7. The process of claim 1, in which the electrolytic precipitation is accomplished by the use of electrodes of such nature that they leave no traces upon the material upon which the precipitation has occurred.

8. The process of claim 1, in which the electrolytic precipitation is accomplished by the use of electrodes formed in relatively thin coatings upon a suitable conductive carrier and in which the electrodes are of such nature that they leave no traces upon the material upon which the precipitation has occurred.

Signed at Berlin, Germany, this 26th day of June 1930.

MAX VOLMER.